United States Patent

Blake-Coleman

[11] Patent Number: 5,160,616
[45] Date of Patent: Nov. 3, 1992

[54] FILTERING APPARATUS

[75] Inventor: B. C. Blake-Coleman, Salisbury, United Kingdom

[73] Assignee: Public Health Laboratory Service Board, London, England

[21] Appl. No.: 721,471

[22] PCT Filed: Dec. 12, 1989

[86] PCT No.: PCT/GB89/01485
§ 371 Date: Aug. 12, 1991
§ 102(e) Date: Aug. 12, 1991

[87] PCT Pub. No.: WO90/06804
PCT Pub. Date: Jun. 28, 1990

[30] Foreign Application Priority Data

Dec. 12, 1988 [GB] United Kingdom ............... 8828949

[51] Int. Cl.$^5$ ............. B01D 63/08; B01D 65/02; B01D 69/06; B01D 69/10
[52] U.S. Cl. ............. 210/321.84; 210/321.64; 210/321.67; 210/321.75; 210/500.22; 210/500.21; 210/500.42; 210/489; 210/492; 210/407; 210/785; 210/488
[58] Field of Search .......... 210/500.22, 500.21, 210/500.42, 492, 407, 489, 321.75, 321.84, 321.64, 321.67, 384, 392, 490, 446, 447, 314, 488, 748, 785; 55/158, 488, 489

[56] References Cited

U.S. PATENT DOCUMENTS

| | | | |
|---|---|---|---|
| 1,198,938 | 9/1916 | McClarrinon | 209/398 |
| 2,315,651 | 4/1943 | Peterson | 209/398 |
| 3,334,750 | 8/1967 | Ullman | 210/489 |
| 3,491,021 | 1/1970 | Huntington | 210/321.67 |
| 3,517,811 | 6/1970 | Newfarmer | 210/321.67 |
| 3,812,972 | 5/1974 | Rosenblum | 210/489 |
| 4,234,430 | 11/1980 | Peer | 210/489 |
| 4,280,909 | 7/1981 | Deutsch | 210/500.21 |
| 4,473,473 | 9/1984 | Cheng | 210/500.42 |
| 4,904,394 | 2/1990 | Clarke | 210/748 |
| 4,921,612 | 5/1990 | Sirkar | 210/500.21 |
| 4,948,561 | 8/1990 | Hinckley | 210/492 |

FOREIGN PATENT DOCUMENTS

| | | | |
|---|---|---|---|
| 245863 | 11/1987 | European Pat. Off. | 210/500.22 |
| 202703 | 10/1985 | Japan | 210/500.21 |
| 2079806 | 4/1987 | Japan | 210/500.42 |
| 2208611 | 4/1989 | United Kingdom | 210/321.84 |
| 8607284 | 12/1986 | World Int. Prop. O. | 210/748 |

*Primary Examiner*—Stanley S. Silverman
*Assistant Examiner*—Thomas M. Lithgow
*Attorney, Agent, or Firm*—Browdy and Neimark

[57] ABSTRACT

Filtering apparatus for the separation of microparticles such as bacteria has two planar sheets each with an array of laser drilled or etched pores. One or both of the sheets can be displaced relative to the other under feedback control to bring the pores into greater or lesser register. The effective pore size is thus varied to provide controlled selectivity.

8 Claims, 3 Drawing Sheets

FILTERING APPARATUS

BACKGROUND OF THE INVENTION

This invention relates to filtering apparatus.

In industrial and laboratory separation processes, particularly as part of an analytical procedure or in the biotechnological and pharmaceutical industries, it is often a necessary part of the purification procedure for any product to pass through one or more stages of filtration. Thus, an essential part of many processing activities is that of separating microparticles from a suspension. By "microparticle" is meant a particle of dimension no greater than about 50 microns with the term "particle" intended to include cells, viruses and macromolecules. The need for filtering systems is thus seen as an important tool in the extraction of products and by-products or in purification procedures.

Where the filtration system is primarily a barrier of fixed diameter pores, the effect is merely to prevent all microparticles larger than the maximum pore size from being transported by the carrier flow across the filter. As the residue builds up, the transport efficiency becomes worse because of pore blocking. Blocking cuts down flow and has the effect of progressively reducing the particle size transported, being eventually far smaller than the original pore diameter. Multi-stage filtration, using a series of filters with different pore sizes, alleviates the rapid loss common to single filters, but eventually requires replacement as with single units. Such methods are costly and in many circumstances impracticable.

Ideally, a filtration system should be programmable to a range of pore sizes and be able to clear fouling without disassembly. It is an object of this invention to provide approved filtering apparatus meeting these desiderata.

It should be recognised that, in a different field, U.S. Pat. No. 2,315,651 discloses an adjustable screen for a shaker assembly, the screen having top and bottom plates each with an array of square apertures. A screw thread arrangement is provided for sliding the top plate, to vary the registration of the top and bottom apertures. This is intended to reduce the time needed to adjust the equipment to meet varying sifting requirements.

SUMMARY OF THE INVENTION

Accordingly, the present invention consists in filtering apparatus for the selective filtration of microparticles comprising first and second filter elements each having a planar working surface and a plurality of filter apertures opening to said working surface in a regular array, the filter elements being arranged with the respective working surfaces substantially in contact, such that relative displacement of the elements in a direction in the plane of the working surfaces serves to bring the apertures of the first filter element into greater or lesser register with the apertures of the second filter element, the relative position of the filter elements corresponding with the maximum registry providing an effective pore size of the apparatus of up to about 50 microns; and control means for controlled relative displacement of the filter elements in said direction.

Preferably, at least one of the filter elements includes piezoelectric material and said control means includes means for applying an electrical potential to said piezoelectric material.

The essential principle of the method is that of producing an occlusion or masking of a pore by the relative shift of another located above (or below) and which was previously axially registered with it. Consider two thin sheets of material both having perfectly regular arrays of holes in a cubic pattern, that is with each hole equidistant from the other. The sheets are dimensionally identical. If now, the two sheets are overlayed then each pore centre will have the same axis as the one above or below. So long as the pitch (spacing) between pores is greater than the pore diameter, then sufficient lateral displacement along the line of the pores will result in a condition where any one pore is facing the blank material between pores in the other membrane. When the pores on both sheets are registered axially then displacement towards (but other than) complete occlusion will result in an effectively smaller pore (reducing to an elliptical geometry) prior to occlusion. In short, lateral or vertical displacement along the line of the pore array produces a reduction in pore size. As a filter it is conditional upon the spacing between membranes or sheets being constantly smaller than the smallest particle likely to be encountered (say 0.15 micron) thus eliminating leakage.

To produce a suitable membrane or porous sheet two distinct approaches have been employed. Each technique is determined by the eventual method of providing relative movement between the membranes or sheets. Where the membrane is piezoelectric and self-acting, then the method has been termed active, where the membrane requires external mechanical forces to produce displacement the method is treated as passive.

BRIEF DESCRIPTION OF THE DRAWINGS

The invention will be described by way of example with reference to the accompanying drawings in which.

DESCRIPTION OF THE PREFERRED EMBODIMENTS

It will be helpful first to consider the form and construction of filter elements for use in the present invention. In the case of active filter elements it is preferred to use polyvinylidinefluoride (PVDF) which is a common polymer known to possess good piezoelectric properties after suitable conditioning (electric poling). The dimensional change of PVDF in sheet form is approximately 20 volts per micron. In one embodiment of the present invention, PVDF was laser drilled with a matrix of 30 micron holes. The array formed a 100×100 cubic pattern of 30 micron pores with an edge to edge pore spacing of 200 microns, which was repeated to form an identical pattern of pores in another sheet. Alternatively, but less preferred, both sheets may be laser drilled simultaneously by starting with the sheets already overlaid in a suitable mounting. Registration in the first case is sacrificed to some extent but laser focusing problems in the latter can cause adhesion difficulties and pore variability. For these and similar reasons, the first approach is favoured.

An alternative technique is electron beam drilling utilising PVDF sheets and generally similar pore arrays. It will be understood of course, that both laser and electron beam drilling can be utilized with piezoelectric polymers other than PVDF.

For passive filter elements, the preferred techniques are generally the conventional methods of photoetching. Using methods common to the semi-conductor and glass industries, photo-resist techniques allow the production of thin (50-150 micron) porous sheets of glass, silicon or stainless steel. In such materials, the minimum thickness available means that the photo-mask is usually produced with dots smaller than the actual etched pore. The etching well is dimensioned so that the etchant cuts through the sheet just at a point where the pore diameter is that desired. Fabrication difficulties often mean that the pores are formed to larger diameters than active membranes. This, however, is less problematic than in the active system, since displacements available to passive membranes (externally driven) are much greater.

In one example, a photographic mask is produced having an outline corresponding to a regular array of 50 micron pores with a centre to centre spacing of 125 microns. A stainless steel sheet of thickness 100 microns is coated with a commercially available UV resist and exposed through the prepared mask. After solvent etching of the resist, the stainless steel is etched with nitric acid and neutralised with a sodium hydroxide wash. In an alternative, the same mask is employed in the thick etching by hydrofluoric acid of a glass sheet of 80 microns.

The construction of filter housings will now be described, with particular reference to the drawings.

Figure 1A:
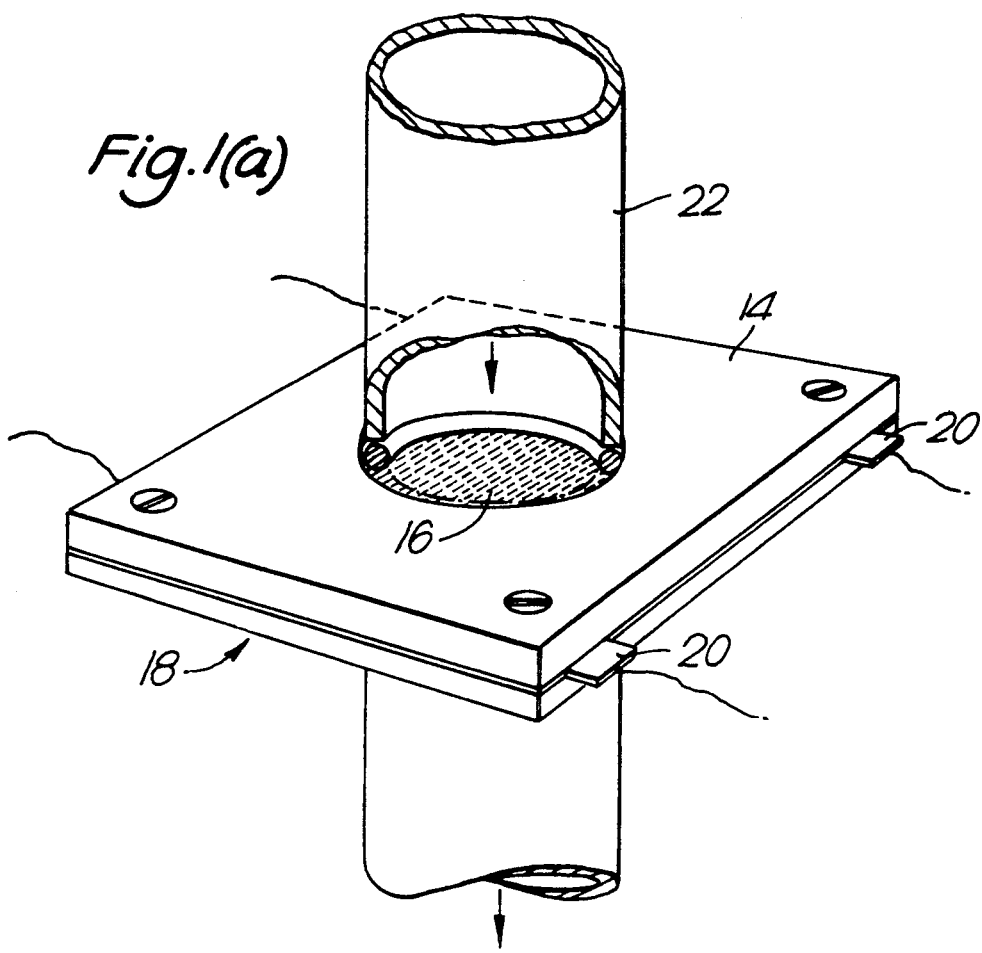
FIGS. 1(a) and 1(b) show in perspective and sectional form, respectively, filtering apparatus according to the present invention.
Figure 1B:
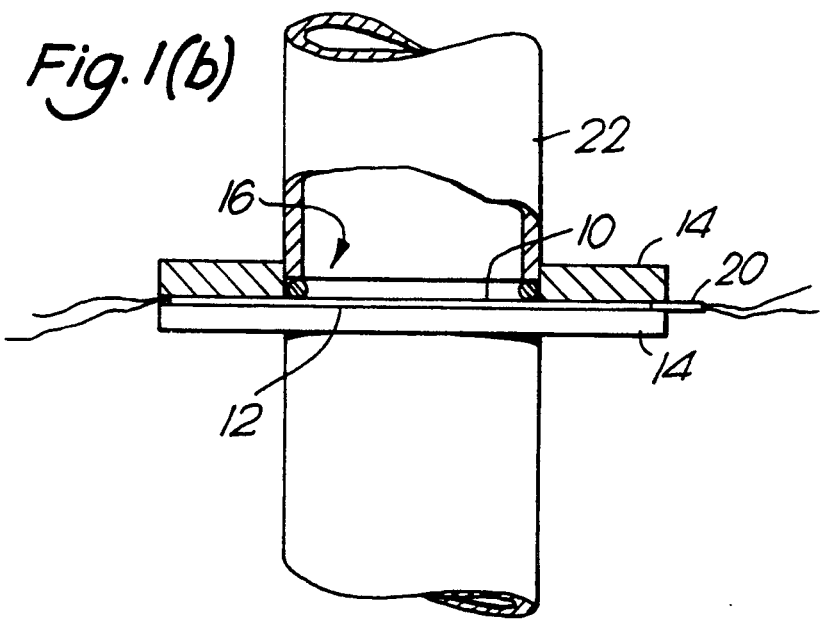

As shown in FIGS. 1(a) and 1(b), two membranes of PVDF 10, 12 with registered pores are clamped between housing plates 14 so as to extend across the mouth 16 of the filter housing shown generally at 18. Electrodes (not shown) are provided on the PVDF membranes by sputtering or other suitable techniques and establish electrical connection with external terminals 20. The housing plates 14 are formed of electrically insulating material. The housing is mounted top and bottom into feeder tubes 22 which are aligned with the mouth 16. A D.C. potential is applied to the membrane terminals 20 with opposite polarity such that the dimensional change produces a shift in each membrane in the plane of the filter mouth, the two membranes shifting in opposite directions.

Figure 2:
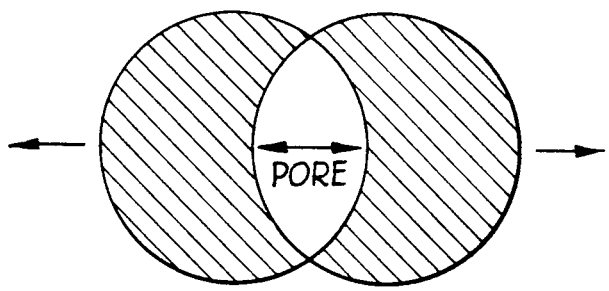
FIG. 2 is a diagram illustrating the operation of filtering apparatus according to the invention.

The pore occlusion effect is illustrated in FIG. 2 which shows the effective pore size for a specific relative displacement between the membranes.

Figure 3:
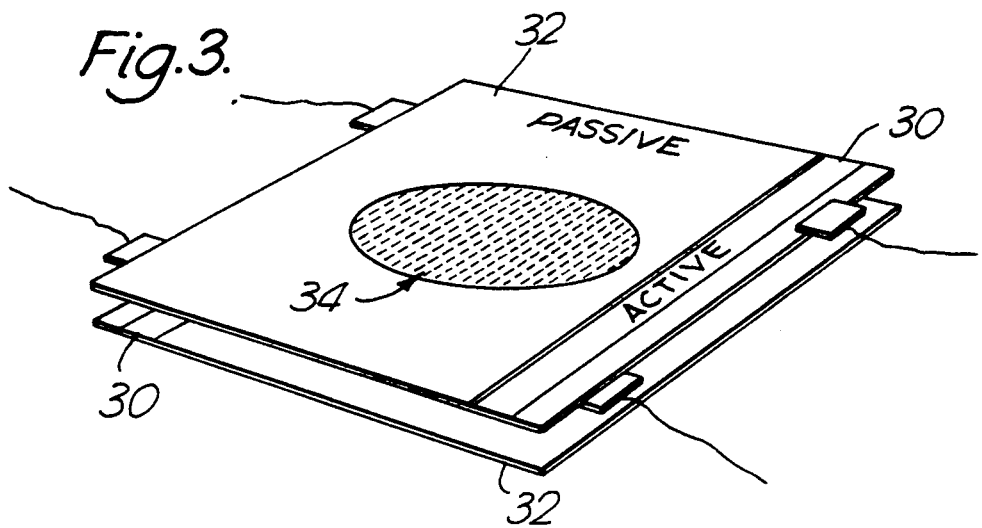
FIG. 3 is a sketch illustrating a modification to the apparatus of FIG. 1(a).

In an alternative embodiment, where the laser drilled membrane is passive, PVDF strips can be used to provide the relative displacement. Thus, as shown in FIG. 3, PVDF strips 30 are bonded to each filter membrane 32 with the filter membranes having an array of pores 34. As with the previously described embodiment, a voltage is applied with the required polarity to each strip. Where smaller displacements will suffice, it will be recognised that only one filter membrane need be provided with a PVDF or other piezoelectric transducer.

Figure 4:
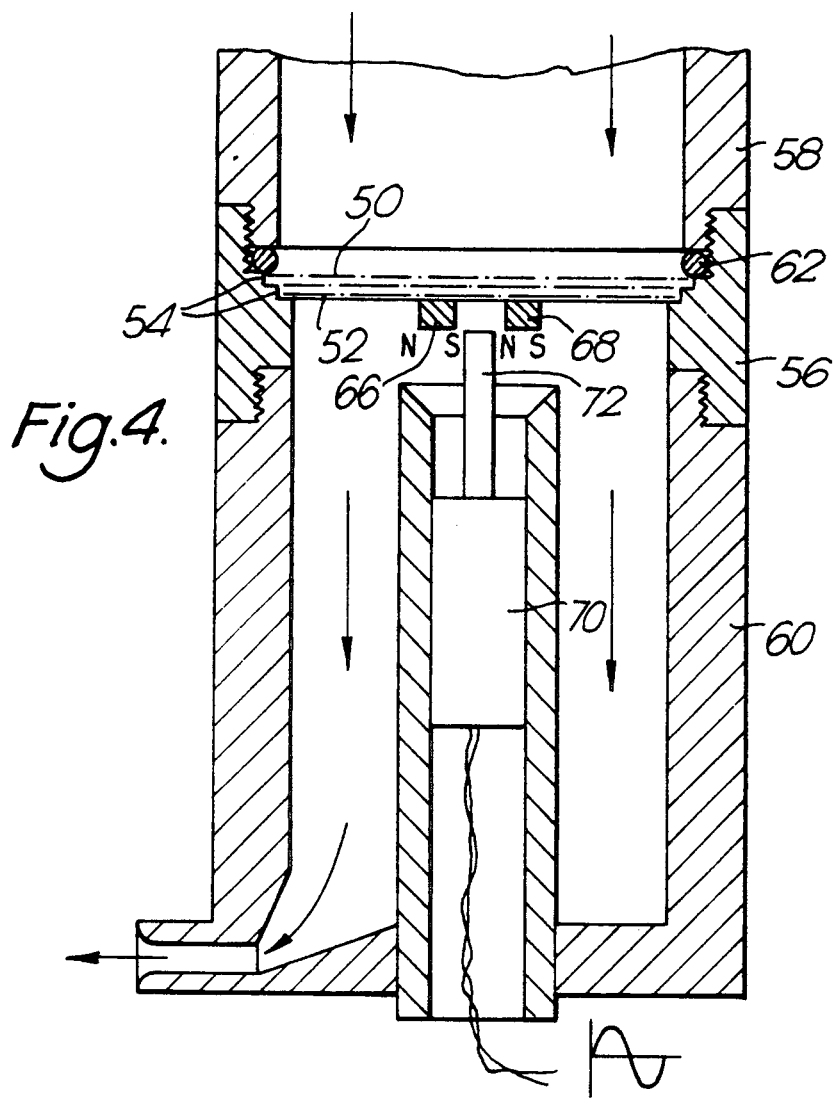
FIG. 4 is a section through filtering apparatus according to a further embodiment of this invention.

In the arrangement of FIG. 4, two chemically etched porous sheets 50 and 52 are registered and mounted in respective steps 54 of a filter housing 56. The upper sheet 50 will remain static through close engagement with the corresponding step 54, while the other sheet is capable of slight movement because of clearance between the sheet and the corresponding step. Upper and lower feed tubes 58, 60 communicate with the filter housing and are appropriately sealed, such as with O-ring 62. Movement of the lower sheet 52 is accomplished by electromagnetic drive methods such as that now described.

The lower sheet 52 has two very light magnetic rubber pole pieces 66 and 68 bonded to the underside. Below these, and set into the flow path is a sealed magnetic field coil 70 having a pole piece 72. With the magnetic rubber pieces 66 and 68 set with opposite poles facing, any polarity of magnetic pole produced in the field coil will result in a force of attraction, and repulsion, simultaneously from the rubber pole pieces. The forces involved are quite high local to the filter sheet and small displacements take place.

It is believed that actual slip of the lower sheet relative to the upper need not take place, rather a degree of yield due to the elasticity of the housing and mounting system, provides for sufficient displacement of the filter pores.

Figure 5:
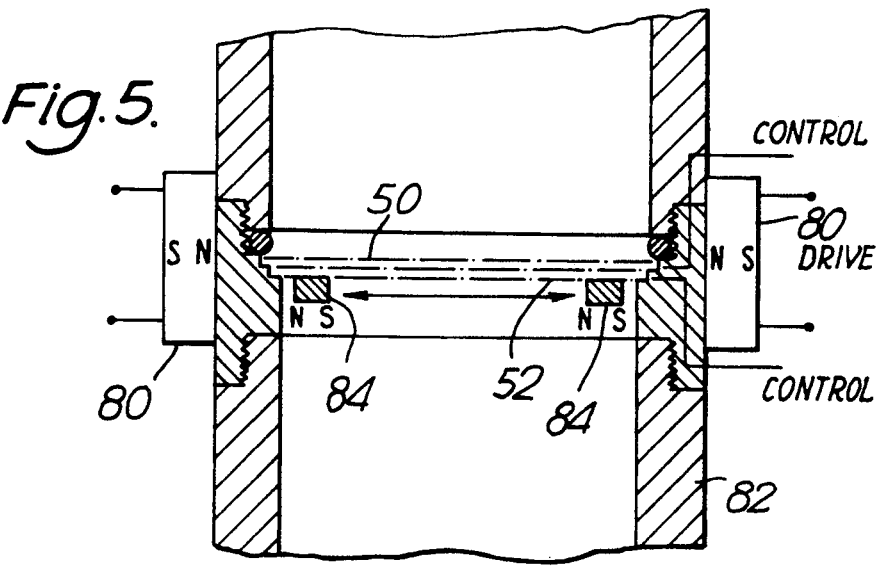
FIG. 5 is a section through filtering apparatus according to a further embodiment of this invention.

Another embodiment, shown in FIG. 5, eliminates the need for an immersed field coil. Instead, field coils 80 are arranged around the outside of the filter tube 82 and apply a force in a push-pull arrangement against small magnet located pole pieces 84 now towards the periphery lower sheet.

Self-cleaning can be accomplished by the rapid displacement of the sheets which is easily accomplished using a low frequency A.C. drive to the fields coils resulting in rapid agitation at the membrane. Oftimes, with small (programmed) pores simply increasing the pore size (lower control voltage) causes defouling, but this must be done with the flow stream diverted to avoid contamination of the wanted downstream flow.

The ability to provide relative displacement implies a perfect realignment of the pores on deenergising. To some extent the elasticity due to the mechanical nature of the housing accounts for return to registered pores but it has been found that this cannot always be assumed. This problem is solved to a great extent by including in the passive methods a displacement detector and driving the filter membranes in feedback to achieve the desired pore occlusion.

When restitutional elasticity can be relied on to return the pore alignment to perfect re-registration, then the pore size control remains simply that of calibration of the applied PD. Hence, a linear relationship between voltage and displacement allows pore sizes to be established within limits i.e. 0-30 volts=0-30 micron=1 volt/micron. This relationship is, however, something significantly non-linear and subject to drift through ageing, temperature, stiction and other effects. Feedback control through a position sensor is then also necessary.

Figure 6:
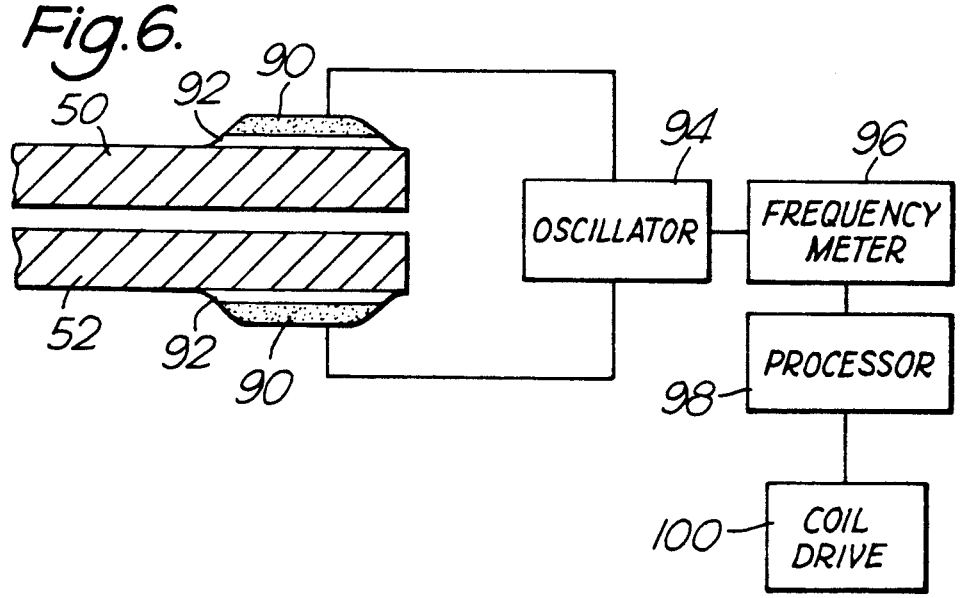
FIG. 6 is a diagram illustrating feedback position control according to a preferred form of the invention.

To overcome such problems the overlaid sheets can be made as shown in FIG. 6 with a very small electrode area 90 printed near the edge of each sheet. The electrodes are separated from the filter sheet by dielectric layer 92 and insulated from the main flowstream of the suspension to avoid conductivity problems. The electrodes 90 are then made to form part of a high frequency electronic oscillator such that small displacements change the effective capacitance of the electrodes and vary the oscillator frequency. Specifically, the electrodes are connected through pick-ups in the filter tube with an rf oscillator 94. The oscillator is arranged, in a fashion which will be obvious to the skilled man, such that a change of capacitance between the electrodes 90 will cause a measurable change in oscillator frequency. A frequency meter 96 detects this change and provides an output to processor 98 which may take the form of a commercially available microprocessor. Processor 98 compares the measured oscillator frequency with that known from calibration to correspond with a desired effective pore size and provides an appropriate control signal to coil drive 100. A simple oscillator circuit can be expected in this way to provide pore size resolution of approximately 2.5 micron.

Calibration may be carried out in situ by employing known particle sizes in suspension and determining transport for given field coil potentials.

It should be understood that this invention has been described by way of examples only and a variety of modifications can be made without departing from the scope of the invention. Thus, the active or filter elements need not take the form of membranes and can be produced by a variety of techniques. Electron beam etching is a possible alternative to laser drilling and a variety of chemical etching processes will suggest themselves to those skilled in the production of semiconductor devices. It is not essential that the arrangement of pores in each filter element should be identical, although this is believed to be the best arrangement. One alternative, for example, would be to have an array of laser drilled apertures in one filter element and a parallel array of etched slots in the other filter element. The width of each slot might correspond with the width of a pore, whilst the spacing between the slots would correspond with the spacing between rows of pores. Still further geometries will occur to those skilled in the art. Similarly, a wide variety of drive techniques can be employed.

I claim:

1. Filtering apparatus for the selective filtration of microparticles comprising first and second filter elements each having a planar working surface and a plurality of filter apertures opening to said working surface in a regular array, the filter elements being arranged with the respective working surfaces substantially in contact, such that relative displacement of the elements in a direction in the plane of the working displacement of the elements in a direction in the plane of the working surfaces serves to bring the apertures of the first filter element into greater or lesser register with the apertures of the second filter element, the relative position of the filter elements corresponding with the maximum registry providing an effective pore size of the apparatus of up to about 50 microns; and control means for displacing at least one of said filter elements relative to the other filter element in said direction thereby bringing the apertures of the first filter element into greater or lesser register with the apertures of the second filter element.

2. Filtering apparatus according to claim 1, wherein at least one of said filter elements includes piezoelectric material and said control means includes means for applying an electrical potential to said piezoelectric material.

3. Filtering apparatus according to claim 2, wherein the filter apertures of said one filter element are provided within said piezoelectric material.

4. Filtering apparatus according to claim 1, wherein said control means comprises means for displacing at least one of said filter elements electromagnetically.

5. Filtering apparatus according to claim 4, wherein said one filter element is provided with magnetic means and wherein said control means includes an electromagnetic coil.

6. Filtering apparatus according to claim 1, wherein said control means comprises means for determining the relative position of the filter elements and means for displacing at least one of the filter elements in feedback.

7. Filtering apparatus according to claim 6, where said means for determining relative position comprises a capacitive pickup on at least one of the filter elements, an oscillator including the thus formed capacitor, and means for determining the frequency of oscillation.

8. Filtering apparatus according to claim 1, wherein the array of filter apertures in the two filter elements is substantially identical.

* * * * *